(12) United States Patent
Werz et al.

(10) Patent No.: US 11,745,246 B2
(45) Date of Patent: Sep. 5, 2023

(54) METHOD FOR THE PRODUCTION OF TAILOR WELDED BLANKS (TWBS)

(71) Applicant: UNIVERSITAET STUTTGART, Stuttgart (DE)

(72) Inventors: Martin Werz, Dettingen (DE); Stefan Weihe, Buxheim (DE); Lisa Ehemann, Bad Rappenau (DE)

(73) Assignee: UNIVERSITAET STUTTGART, Stuttgart (DE)

( * ) Notice: Subject to any disclaimer, the term of this patent is extended or adjusted under 35 U.S.C. 154(b) by 356 days.

(21) Appl. No.: 16/128,709

(22) Filed: Sep. 12, 2018

(65) Prior Publication Data

US 2019/0084027 A1    Mar. 21, 2019

(30) Foreign Application Priority Data

Sep. 19, 2017    (EP) .................................... 17191949

(51) Int. Cl.
*B21D 35/00* (2006.01)
*B23K 35/28* (2006.01)
(Continued)

(52) U.S. Cl.
CPC .............. *B21D 35/006* (2013.01); *B23K 1/19* (2013.01); *B23K 9/0026* (2013.01); *B23K 9/035* (2013.01);
(Continued)

(58) Field of Classification Search
CPC ............ C22F 1/05–057; B21D 35/006; B21D 35/286; B21D 35/288; B23K 1/19;
(Continued)

(56) References Cited

U.S. PATENT DOCUMENTS

2007/0138239 A1*  6/2007  Kumagai .................. C22F 1/00
                                                                 228/227
2009/0200359 A1*  8/2009  Chen .................... B23K 20/126
                                                                228/112.1
(Continued)

FOREIGN PATENT DOCUMENTS

DE           1274346 B      8/1968
WO        2016138987 A1     9/2016

OTHER PUBLICATIONS

Totten G.E. and DS. MacKenzie, ASM Handbook, vol. 4E, Heat Treating of Nonferrous Alloys, p. 289-295. (Year: 2016).*

(Continued)

*Primary Examiner* — George Wyszomierski
*Assistant Examiner* — Janell C Morillo
(74) *Attorney, Agent, or Firm* — George McGuire

(57) ABSTRACT

Method for producing a component system having a first component with a first component portion and a second component with a second component portion, including the following steps: connecting, in particular welding or soldering, the first component portion, which consists of an aluminum alloy, to the second component portion, which in particular consists of a naturally aged aluminum alloy, a copper alloy or an iron alloy, in particular a steel alloy, so as to form a connection seam; artificially aging the connection seam such that the yield strength of the connection seam is above the yield strength of the first component portion and/or of the second component portion; and deforming, in particular deep-drawing and/or stretch-drawing, the component system.

12 Claims, 2 Drawing Sheets

(51) Int. Cl.
| | |
|---|---|
| *C22F 1/047* | (2006.01) |
| *C22F 1/057* | (2006.01) |
| *B23K 9/23* | (2006.01) |
| *B23K 20/12* | (2006.01) |
| *B23K 1/19* | (2006.01) |
| *B23K 103/10* | (2006.01) |
| *B62K 19/28* | (2006.01) |
| *B23K 9/035* | (2006.01) |
| *B23K 9/00* | (2006.01) |
| *C22F 1/053* | (2006.01) |
| *B23K 26/24* | (2014.01) |
| *C22F 1/04* | (2006.01) |
| *B23K 20/233* | (2006.01) |
| *B23K 31/12* | (2006.01) |
| *C22C 21/06* | (2006.01) |
| *B23K 101/18* | (2006.01) |
| *B23K 101/00* | (2006.01) |
| *C22C 21/10* | (2006.01) |
| *C22C 21/12* | (2006.01) |
| *B23K 103/12* | (2006.01) |
| *B23K 103/20* | (2006.01) |

(52) U.S. Cl.
CPC ............... *B23K 9/23* (2013.01); *B23K 9/232* (2013.01); *B23K 20/122* (2013.01); *B23K 20/2333* (2013.01); *B23K 26/24* (2013.01); *B23K 31/12* (2013.01); *B23K 35/288* (2013.01); *B62K 19/28* (2013.01); *C22F 1/04* (2013.01); *C22F 1/047* (2013.01); *C22F 1/053* (2013.01); *C22F 1/057* (2013.01); *B23K 2101/006* (2018.08); *B23K 2101/185* (2018.08); *B23K 2103/10* (2018.08); *B23K 2103/12* (2018.08); *B23K 2103/20* (2018.08); *C22C 21/06* (2013.01); *C22C 21/10* (2013.01); *C22C 21/12* (2013.01); *Y10T 428/12764* (2015.01)

(58) Field of Classification Search
CPC .......... B23K 2103/10; B23K 2101/185; B23K 26/24; B23K 20/122; B23K 20/2333; B23K 20/2336; B23K 9/23; B23K 9/232; B23K 9/035; B23K 9/0026; Y10T 428/12764; B62K 19/28
See application file for complete search history.

(56) References Cited

U.S. PATENT DOCUMENTS

2011/0236718 A1 9/2011 Fukuda et al.
2014/0290064 A1* 10/2014 Smeyers ............... B21D 39/03
29/897.2

OTHER PUBLICATIONS

Rudnev, V and G.E. Totten, ASM Handbook, vol. 4C, Induction Heating and Heat Treatment, p. 346-358. (Year: 2014).*
Totten, G.E. and DS Mackenzie, "Heat Treatment Practices of Age-Hardenable Aluminum Alloys", ASM Handbook, vol. 4E, Heat Treating of Nonferrous Alloys, pp. 245-273. (Year: 2016).*

* cited by examiner

METHOD FOR THE PRODUCTION OF TAILOR WELDED BLANKS (TWBS)

CROSS-REFERENCE TO RELATED APPLICATIONS

This application claims priority to European Application No. EP 17 191 949.1-2016 filed on Sep. 19, 2017, the entire disclosure of each of which is incorporated herein by reference.

BACKGROUND OF THE INVENTION

The invention relates to a method for producing a component system. The invention also relates to an associated component system.

Temperature specifications of significance for the invention are always given in degrees Celsius [° C.]. The term "yield strength" also includes a substitute yield strength, such as the substitute yield strength Rp0.2.

Component systems, such as what are known as tailor welded blanks (TWBs), are becoming increasingly popular in the automotive industry. In this connection, TWBs are used in particular in order to be able to design deformable components of the vehicle body to have different local metal sheet thicknesses and/or materials. In this case, initially unshaped, planar metal sheets are welded, if necessary so as to have different thicknesses and/or materials, and are then deformed together. This results in the possibility of producing a component having in particular locally differing metal sheet thicknesses and/or materials such that the component can be optimally adapted to external loads, and therefore the weight of the component can be optimized.

When welding ferritic steels, which are often used these days in vehicle manufacturing, the rapid cooling in the welding process during TWB production leads to a local increase in hardness of the weld seam. This means that, in the case of correspondingly selected welding parameters, the weld seam has a higher static strength, in particular a higher yield strength, than the surrounding base material, i.e. the unchanged material of the metal sheets. When steel TWBs produced in this manner are deformed, the expansion is thus not localized in the connection seam, and comparatively high degrees of deformation can be realized for example by means of a deep-drawing or stretch-drawing process.

If, however, steel sheets are welded together with aluminum sheets, or different aluminum sheets are welded together, in order to form a hybrid or aluminum TWB, the welding behavior differs significantly. The background to this is as follows: Aluminum alloys are essentially divided into the groups of self-hardening and hardenable aluminum alloys. The strength of the self-hardening alloys stems primarily from solid-solution solidification, which is optionally enhanced by cold forming. In contrast, hardenable aluminum alloys can be hardened by means of precipitation hardening. This involves superfine precipitates contributing to the strength. These precipitates are precipitated as follows: initially, the corresponding alloy is quenched from the melt or is subsequently quenched after a solution annealing process. The quenching prevents the alloy from achieving its thermodynamic equilibrium. The cooling therefore has to take place at an alloy-dependent minimum cooling speed or below a maximum cooling duration such that a critical cooling speed of the aluminum alloy is exceeded, or a critical cooling duration thereof is not reached. In the case of subsequent natural and/or artificial aging, superfine precipitates are formed, with the alloy pushing towards its thermal equilibrium.

In this connection, it has been observed that, when welding hardenable aluminum alloys which have already been naturally and/or artificially aged, the yield strength of the weld seam does not completely reach the yield strength of the base material surrounding the weld seam. The yield strength of the weld seam is therefore lower than the yield strength of the surroundings. In the case of plastic deformation, such as during the deformation process, the expansion is therefore localized in the region of the weld seam.

It is precisely this problem which occurs during TWB production or use, in particular the deformation thereof: a comparatively long period of time passes between the metal sheet being produced by the material manufacturer, with solution annealing and then quenching of the metal sheet usually being carried out after rolling, and a TWB subsequently being produced from the metal sheets by means of metal-sheet welding by the supplier or automotive manufacturer. This results in increased strength of the metal sheets as a result of natural aging up until the TWB production. It follows therefrom that the yield strengths of weld seams of the produced TWBs do not reach the yield strength of the metal sheet regions surrounding the weld seams, since the increased strength as a result of natural aging lags behind that of the base material.

On account of this locally low strength, the weld seams can thus be placed only in regions which have comparatively less loading in the deformation process, and therefore the field of application of aluminum-steel hybrid TWBs or of aluminum TWBs is very limited, whereas steel TWBs are comparatively well established and are already used in production vehicles, for example in the door region. In order to achieve an improvement here, tools having additional stamps for fixing the weld seams are used in research in order to reduce the loading of said seam during deformation. This process is very complex, however, and can be transferred to complex geometries only with great difficulty, and thus at great expense.

In order to counter this problem, it is known to carry out a solution annealing step before deforming. Here, the TWB is initially solution-annealed and then quenched. This method is nevertheless unsuitable in the case of aluminum-steel hybrid TWBs since brittle intermetallic phases are formed between aluminum and steel in this case on account of diffusion processes.

In addition, a fluid is required in most cases during quenching following the solution annealing. This results in the components becoming wet, and possibly contaminated. It has also been shown that the solution annealing in the connection seam can result in detrimental "bubbles" being formed which are likely caused by surface coatings (dry lubricant, oiling, cleaning agent, etc.) being applied during the welding process.

It has also been observed that solution annealing followed by quenching leads to warpage in the case of components that have already been deformed. In particular in the case of press welding connections, the welding process can result in a critical deformation, meaning that there may be recrystallization with grain coarsening during the solution annealing process, and therefore the strength in the region of the connection seam may be compromised.

SUMMARY OF THE INVENTION

The object of the invention is therefore to remedy the above-mentioned drawbacks of the prior art. In particular, the method is intended to provide an opportunity, in the case of TWBs, to avoid solution annealing followed by quenching after TWB production.

Therefore, according to the invention, a component system comprising a first component having a first component portion and a second component having a second component portion is produced. For this purpose, initially, the first component portion is connected to the second component portion in particular by means of a welded connection or a soldered connection. A connection seam is formed in the process. The first component portion consists of a precipitation-hardenable naturally aged aluminum alloy.

The natural aging may be carried out as a material-treatment step. Then again, there is usually a comparatively long period of time between the production of the first component, or the production of precursors to the first component, and the connection thereof to the second component. For instance, the first component can age "by itself" for example during storage with the manufacturer, distributor or where the components are connected. The natural aging can therefore take place in particular during storage of the first component.

The second component portion can in particular be metallic. In this case, the second component portion can consist of a precipitation-hardenable, and in particular naturally aged aluminum alloy. However, it would also be conceivable for the second component portion to consist of a self-hardening aluminum alloy.

On the other hand, the second component portion can also consist of a copper alloy or an iron alloy, such as steel. In the case of steel, this can be in particular microalloyed steels, fine-grained steels, ferritic steels or austenitic steels.

Furthermore, the connection seam is artificially aged, in particular such that the yield strength of the connection seam is higher than the yield strength of the first component portion and/or of the second component portion. In particular, the yield strength is then higher than the yield strength of both component portions.

An increase in the yield strength is normally accompanied by an increase in strength or hardness. As such, the terms "strength" and/or "hardness" can be used instead of the term "yield strength."

In order to make it possible to artificially age the connection seam, the cooling speed or cooling duration naturally have to be so high or short, respectively, that there is no thermodynamic equilibrium in the connection seam after cooling (quenching).

The following effect is utilized in order to achieve a yield strength that is above the yield strength of the component portions by artificially aging the connection seam: It has surprisingly been observed that the yield strength when artificially aging a non-naturally aged material increases more rapidly than the yield strength of a naturally aged material, in particular at low artificial aging temperatures. As a result, the yield strength of a non-naturally aged material that is initially lower before the heat treatment surpasses the yield strength of a naturally aged material after a certain period of artificial aging. In this case, only the connection seam may be artificially aged. Alternatively, the entire component system may be aged. The above-mentioned effect can be achieved in both cases.

In order to efficiently utilize this effect, the connection seam should be naturally aged only in part, or not at all. The degree of natural aging should at least be significantly lower than the degree of natural aging of the surrounding component portions.

The connection seam is in particular "fresh" following the connection process. This is understood to mean that the seam is as good as solution-annealed and quenched and is not naturally aged, whereas the two component portions surrounding the connection seam, insofar as they are hardenable aluminum alloys, are naturally aged. As a result, the connection seam has a higher yield strength than the surrounding base material within a certain artificial aging time, in particular so long as the connection seam is not yet overaged. The overaging can be prevented for example by the welding or soldering speed during production of the connection seam being above a critical welding or soldering speed.

The method further comprises the additional step c. in which the component system produced according to steps a. and b. is deformed. The deforming can be carried out in particular by means of deep-drawing and/or stretch-drawing. The produced component system can thus in particular be cold-formed. Heating is not required for deforming, and so additional energy can be saved and productivity can be further increased. On account of the fact that the yield strength of the connection seam is higher than that of the component portions surrounding the connection seam (or at least that of the first component portion), at least if said portions consist of an aluminum alloy, an additional effect can also be achieved, as follows: When in particular the component system is deformed, the connection seam expands during the deformation process to a lesser extent than the surrounding regions of the base material, in particular when the components are metal sheets. The connection seam is therefore somewhat thicker than the surrounding regions following the deformation process. On account of the local thickening, the connection seam is loaded to a lesser degree and is more operationally reliable. This is in stark contrast to the prior art, in which the connection seam constitutes the weak spot of the known component systems.

Overall, the invention can achieve the effect whereby the connection seam, in contrast with the prior art, no longer has a lower yield strength or strength than the base material surrounding the connection seam. As a result, the expansion is no longer localized in the connection seam, and there is therefore comparatively significant deformability of the component. In addition, the component no longer has to be solution annealed after welding. Warpage can be prevented as a result. Energy can also be saved since the solution annealing requires significantly more energy than an artificial aging process. Finally, contamination of the components resulting from the quenching process during solution annealing can be prevented. Furthermore, complex and expensive stamps for avoiding expansion localization can be completely omitted in deformation tools. Productivity can be increased overall.

The first component portion can have the same or a different thickness with respect to the second component portion. In particular, the second component portion can be as thick as or thinner than the first component portion.

The first component may in particular have been naturally aged for at least two days, preferably at least 10 days, more preferably at least 30 days, before the connection to the second component is produced. Natural aging during this time ensures that a sufficient degree of natural aging of the first component portion is achieved.

The expansions in the first and/or second component portion can, after deforming, locally amount in particular to more than 5%, preferably more than 10%, more preferably more than 15%, based on at least the fivefold component portion thickness.

Alternatively or in addition, the expansions in the first and/or second component portion can, after deformation transversely to the connection seam, locally amount to more than 5%, preferably more than 10%, more preferably more than 15%, based on at least the threefold, fivefold or tenfold connection seam width.

Preferably, in step a. the cooling speed is at least within a temperature portion, in particular in the temperature range between 400° C. and 200° C., higher than the critical cooling speed of the aluminum alloy of the first component portion and/or of the second component portion if said portion is also produced from a hardenable aluminum alloy. Alternatively or in addition, the cooling duration in the above-mentioned temperature range can be shorter than the critical cooling duration. Critical cooling duration and critical cooling speed mean that, in the case of a shorter duration or a higher speed, respectively, than these critical threshold values, the aluminum alloy is cooled such that no thermodynamic equilibrium can set in, but rather a supersaturated solid solution that is as homogenous as possible is produced. This makes precipitation hardening possible in a subsequent artificial aging process.

In order to reach the critical cooling speed and thus in particular to prevent overaging of the component portions surrounding the connection seam, the welding speed is advantageously greater than 100 mm/min, in particular greater than 250 mm/min, more particularly greater than 1,000 mm/min.

Advantageously, the period of time between step a. and step b., the artificial aging, is less than ten days. In particular, the period of time is less than two days, more particularly less than 2 hours, yet more preferably less than 10 minutes. The shorter the period of time, the lower the degree of natural aging in the connection seam. As a result, the above-described effect, namely the difference in yield strength variation over time, can be optimally utilized in the case of artificial aging of a non-naturally aged material compared with that of a naturally aged material.

Advantageously, the period of time in step a. in which a connection seam portion exceeds 250° C. is less than 200 seconds, in particular less than 30 seconds, and more particularly less than 10 seconds. As a result, the material surrounding the connection seam can be prevented from overaging.

It has been observed that the aging temperature in step b. should preferably be between 60 and 220° C. In particular, the temperature should be between 80 and 200° C., more particularly between 110 and 170° C. A particularly economical aging time can thus be achieved. Furthermore, there is only a slight increase in the yield strength in the base materials surrounding the connection seam, whereas the growth in the connection seam is considerable. For example, in the case of artificial aging, the increase in the yield strength of the base material is less than 30%, in particular less than 15%, whereas the increase in the yield strength in the connection seam can be significantly higher.

The first component portion and/or the second component portion can have a temperature between −30 and 200°, in particular between 20° and 160°, more particularly between 60° and 130 in step a.

In step b., it is possible for only the connection seam to be artificially aged. In this process, the component portions, of the two components, adjacent to the connection seam can be cooled in step b.

It is also conceivable for both component portions to have temperatures between 60° C. and 130° during step a. It is thus conceivable for steps a. and b. to temporally overlap. If in particular a connection seam portion is produced, this then cools to the temperature of the surrounding component portions. If the component portions have elevated temperatures, the artificial aging in step b. can thus take place directly during production of the connection seam portion.

Advantageously, the method also comprises the further step d., namely artificial aging of the entire component system. This second artificial aging step results in the strength of the entire component system being increased. Consequently, the desired end strength is achieved only after the deformation process. It is conceivable in this connection for step d. to be carried out as part of a subsequent stoved finish, in which large amounts of heat can be introduced into the component system so that the resulting heat can be optimally utilized.

The welding process in step a. can in particular be carried out by means of friction stir welding, laser welding or electron beam welding. These welding methods have proven particularly suitable for connecting the two component portions.

Friction stir welding has proven particularly advantageous since the materials are not melted during the welding process, and therefore no solidifying structures are formed. In addition, the heat input and the maximum temperature are comparatively low, meaning that overaging of the produced weld seam, or of the directly adjacent regions, can be prevented.

This makes it possible to achieve high strength of the connection seam. At the same time, a smooth transition of the connection seam or a very flat connection seam can be achieved.

Advantageously, the connection seam can be cooled downstream in step a. Alternatively or in addition, said seam can also be cooled upstream of the seam and/or laterally. This means that in particular the quenching of the connection seam can be ensured, and therefore subsequent artificial aging is possible. The cooling can in this case take place by means of water, compressed air, copper plates or spray mist.

The aging temperature in step d. can in particular be greater than the aging temperature in step b. Alternatively or in addition, the aging temperature in step d. can also be greater than the aging temperature in step b. This results in a substantial increase in strength of the component, even outside of the connection seam, in particular only once the component system is deformed. In the case of a higher temperature, the heat treatment has a uniform effect on the weld seam and the component, and therefore it is expedient to select a higher temperature in step d. than in step a.

The first and/or second component may in particular be semi-finished products. In particular, the semi-finished products can be metal sheets. What are known as TWBs can be produced from these metal sheets by means of the method according to the invention. The metal sheets can have the same or a different thickness. In particular, the second metal sheet can be as thick as or thinner than the first metal sheet.

The first component portion preferably consists of an AlSiMg, AlCu or AlZn alloy. Alternatively or in addition, the second component portion, insofar as it its produced from an aluminum alloy, can also consist of the above-mentioned alloys. In the case of the AlSiMg alloy, the Si proportion is in particular 0.1 to 2.0 wt. %, and/or the Mg proportion is 0.1 to 2.0 wt. %. In the case of an AlCu alloy, the CU proportion is in particular 0.5 to 8 wt. %. In the case of an AlZn alloy, the Zn proportion is in particular 2 to 8 wt. %.

The object is also achieved by a component system produced by means of a method according to the invention.

Therefore, according to the invention, a first component is connected to a second component, the first component comprising a first component portion consisting of a naturally aged aluminum alloy, and the second component comprising a second component portion consisting of a naturally aged aluminum alloy or an iron alloy, in particular steel, the components being connected according to the steps in accordance with the invention. On account of this particular production method, in particular a connection seam yield strength is achieved that is higher than the yield strength of the base materials surrounding the connection seam.

In particular, the component system can in this case be a tailor welded blank (TWB), the first and/or second component thus being metal sheets. In particular both components can be metal sheets, it being possible for the metal sheet thicknesses to be between 0.3 and 5.0 mm.

BRIEF DESCRIPTION OF THE DRAWINGS

Further advantageous embodiments of the invention can be found in the following description of the drawings, on the basis of which one embodiment of the invention is presented in more detail.

In the drawings.

DETAILED DESCRIPTION

Figure 1:
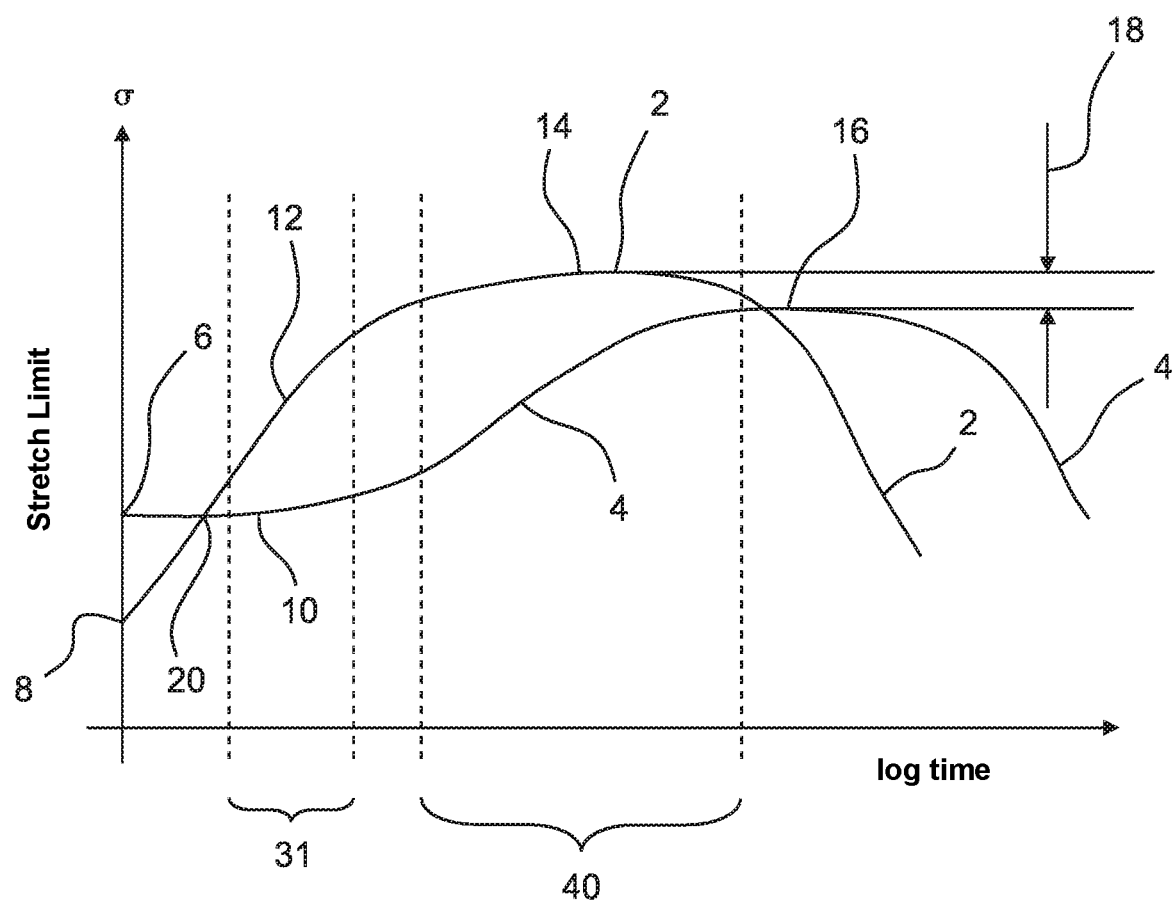
FIG. 1 shows the yield strength variation over time during the artificial aging of the naturally aged or non-naturally aged aluminum alloy.

The present invention is based on an effect which is shown in more detail in FIG. 1. FIG. 1 logarithmically shows the time t on the x-axis. The strength or yield strength Re is also shown on the y-axis. The time t provides the period of time during which a material is artificially aged. In addition, two curves are indicated which show the development of the yield strength of an AlMgSi alloy during the artificial aging between 80° C. and 180° C. The curve 2 in this case represents the yield strength curve of a sample which has not been naturally aged before the artificial aging. The sample from the curve 2 is initially solution annealed and then quenched. On the other hand, the curve 4 represents the yield strength curve of a sample which has initially been naturally aged following the solution annealing and quenching. It can be seen in this case that the naturally aged sample has a higher yield strength 6 before heat treatment than the non-naturally aged sample, the yield strength 8 of which is lower. At the beginning of the heat treatment, the naturally aged sample then initially remains at an approximately stable plateau 10, whereas the non-naturally aged sample is subject to a relatively steep, virtually linear yield strength increase 12. At the point of intersection 20 at quite an early stage of the heat treatment, the yield strength of the non-naturally aged sample therefore surpasses that of the naturally aged sample. The non-naturally aged sample then also reaches the maximum yield strength 14 sooner than the naturally aged sample reaches the maximum yield strength 16. In addition, the maximum possible yield strength 14 of the non-naturally aged sample is higher than that of the naturally aged sample, as indicted by the double arrow 18. This effect occurs equally in other hardenable aluminum alloys.

Figure 2:
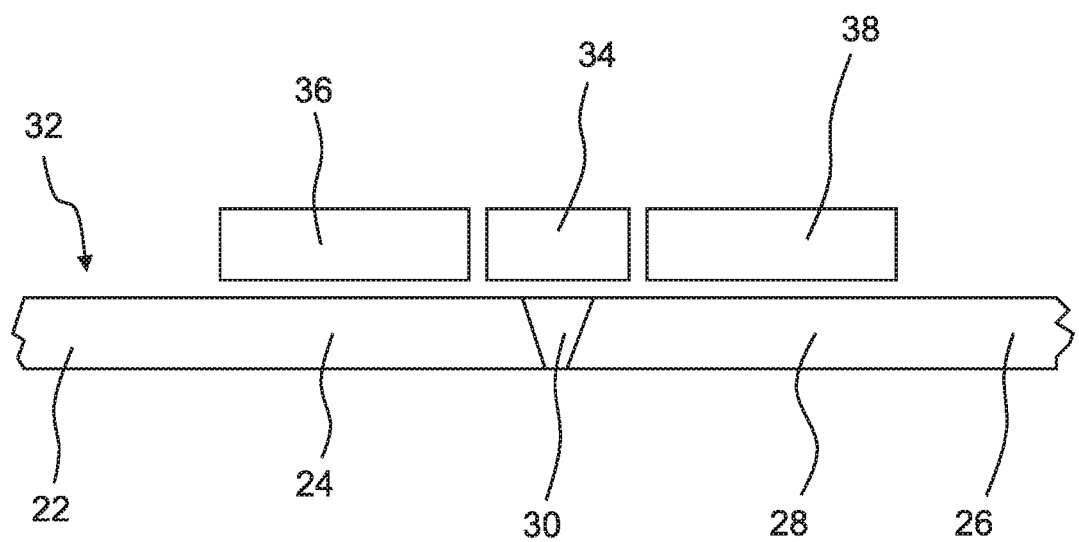
FIG. 2 schematically shows a possible embodiment of the artificial aging of the connection seam.

This effect is utilized in the present invention, as demonstrated in the following on the basis of FIGS. 2 and 3. First of all, FIG. 2 shows a first component 22 having a first component portion 24. Said first component 22 is a metal sheet and is produced throughout from an aluminum alloy, such as an AlMgSi alloy. In the case of the AlSiMg alloy, it can in particular be the case that the Si proportion is 0.1 to 2.0 wt. % and that the Mg proportion is 0.1 to 2.0 wt. %. In this case, the entire metal sheet consists of this alloy. It would nevertheless also be conceivable for only the first component portion 24, i.e. the region in which the later connection seam is located, to consist of said alloy. A second component 26 having a second component portion 28 is also shown. Said component 26 may in particular be a steel sheet. It may also be a metal sheet produced from an aluminum alloy, such as an AlMgSi alloy, in particular with another composition. The components 22, 26 can have the same or a different thickness. It is conceivable in particular for the components 22 and 26 to have different thickness. In particular, the component 26 can be as thick as or thinner than the component 22. The first component portion 24 consists of a naturally aged aluminum alloy. If the second component portion 28 also consists of an aluminum alloy that can be naturally aged, this alloy is likewise naturally aged.

The two components 22, 26 are interconnected by means of a connection seam 30. The connection seam 30 may in particular be a weld seam which can be produced for example by friction stir welding, laser welding or electron beam welding. During the connection process, solution annealing of the connection seam 30 takes place as part of the heat input. In addition, the cooling speed during the welding process has been selected (in particular on account of a sufficiently high welding speed [mm/min]) such that this is greater than the critical cooling speed, and this results in a quenching process and the fact that the connection seam is fully or partially not in the thermodynamic equilibrium. In this case, the connection seam can optionally be cooled during the welding process downstream and/or upstream of the seam and/or laterally by water, compressed air, copper plates, spray mist or similar. Optionally, the component portions 24, 28 surrounding the connection seam 30 can also be cooled in order to prevent solution annealing or optionally artificial aging occurring outside the connection seam. The time at which a point in the connection seam exceeds 250° C. during the connection process is in particular less than 200 seconds. Furthermore, the cooling speed can be greater than the critical cooling speed in particular in the temperature range between 400 and 200° C. If a welding method is used, the welding speed should in particular be greater than 100 mm/min.

After a short period of time, for example at most 10 min, the component system 32 produced in this way undergoes follow-up heat treatment. In this process, the connection seam 30 is heated by a heating means 34. The heating means 34 may be for example a gas flame, an inductive heater or a radiation means such as a laser beam or an electron beam. The component portions 24, 28 can be efficiently cooled by means of the cooling elements 36, 38, which are for example copper plates. Optionally, said portions can also be cooled on both sides.

The first artificial aging process lasts between 10 minutes and 20 hours, in particular between 20 minutes and 2 hours.

In this connection, the effect shown in FIG. 1 is now utilized. The state of the connection seam 30 corresponds to that of the non-naturally aged sample (curve 2). It is therefore solution annealed and quenched, but not yet naturally aged. The component portions 24, 28 on the other hand are naturally aged and correspond to the curve 4. The connection seam 30 therefore hardens during the artificial aging according to FIG. 2, and the yield strength thereof surpasses the yield strength of the component portions 24, 28 rather quickly, as can be seen in FIG. 1. This heat treatment process therefore takes place in the region 31 in FIG. 1.

In contrast with the prior art, the connection seam therefore has a higher or virtually identical yield strength/strength with respect to the component portions 24, 28.

The component system 32 can now be deformed in a next step. The component system 32 constitutes a TWB in this case. Instead of using only two components 22, 26, further components can of course also be welded together.

If the weld seam 30 is produced by means of a welding process, for instance butt joints, lap joints or even combined lap-butt joints are possible with respect to the welding configuration.

The deforming can be carried out for example by means of deep-drawing or stretch-drawing and can thus in particular be a cold deforming process.

Figure 3:
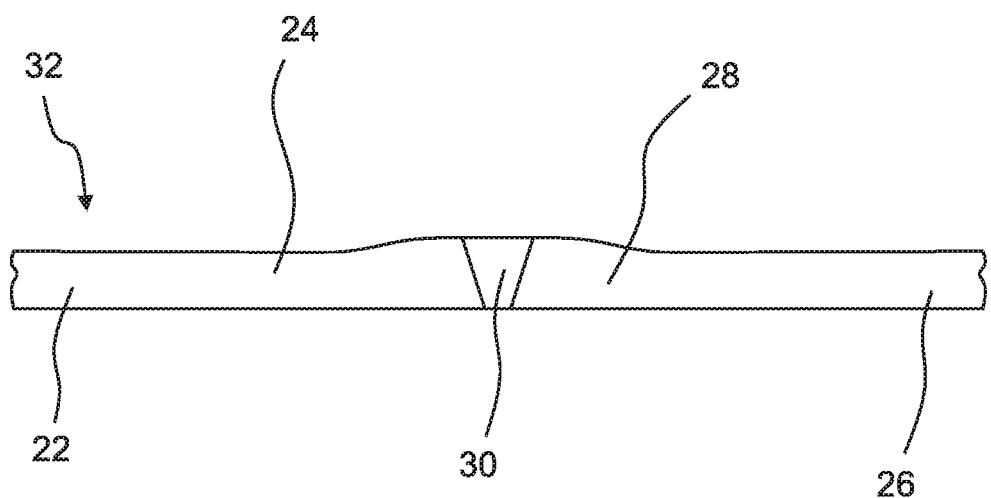
FIG. 3 schematically shows the component system after deforming.

As shown schematically in FIG. 3, the connection seam 30, likewise in contrast with the prior art, is thicker after deforming than the metal sheet thickness of the components 22 and/or 26. This is because the yield strength of the connection seam 30 is higher than that of the component portions 24, 28. An expansion is therefore not localized in the connection seam 30. The connection seam 30 is therefore loaded to a lesser degree than in the prior art, and thus contributes to an increase in operational reliability.

In a final step, the entire component system 32, in this case the TWB, can now undergo a second artificial aging process. In this process, the entire component system is artificially aged and the strength is therefore increased. This step can take place for example as part of a stoving process as a result of the heat input therein. Said artificial aging preferably takes place in the time period 40 according to FIG. 1, and therefore both the connection seam 30 and the components 22, 26 are close to the maximum yield strength or at least undergo a significant increase in strength or yield strength. The advantageous, desirable material properties are achieved as a result. In this case, in particular the temperature in said second artificial aging process can be higher than that in the artificial aging process of the connection seam.

The second artificial aging process lasts between 5 minutes and 10 hours, in particular between 10 minutes and one hour.

In summary, a system is provided in which solution annealing can be omitted after two components 22, 26 have been welded, and the undesirable side effects occurring in the process can thus be excluded. A high degree of deformability can be provided nonetheless.

What is claimed is:

1. Method for producing a component system comprising a first component having a first component portion and a second component having a second component portion, comprising the following steps:

a. connecting the first component portion, which consists of a naturally aged aluminum alloy, to the second component portion, which consists of one of an aluminum alloy, a copper alloy, an iron alloy, or a steel alloy, so as to form a connection seam, wherein the connection occurs at a speed of no less than 100 mm/min;

b. within 10 minutes of forming the connection seam in step (a), artificially aging the connection seam for at least ten minutes such that the yield strength of the connection seam is above the yield strength of at least one of the first component portion and the second component portion; and c. deforming the component system.

2. Method according to claim 1, wherein in step a. there is a critical cooling speed and a critical cooling duration and a cooling speed and/or a cooling duration is at least within the temperature range between 400° C. and 200° C., higher than the critical cooling speed or shorter than the critical cooling duration, respectively, of at least one of the aluminum alloy of the first component portion and the second component portion.

3. Method according to claim 1, wherein in step a. the period of time in which the temperature of a connection seam portion exceeds 250° C. during the connection process is less than 200 seconds.

4. Method according to claim 1, wherein the aging temperature in step b. is 60° C. to 220° C.

5. Method according to claim 1, wherein at least one of the first component portion and the second component portion can have a temperature between −30° C. and 200° C. in step a.

6. Method according to claim 1, wherein in step b. only the connection seam is artificially aged.

7. Method according to claim 1, wherein in step b. the components portions of the two components adjacent to the connection seam are cooled.

8. Method according to claim 1, comprising the further step of:

d. artificially aging the component system, wherein this step takes place by means of a process of stoving into the component system.

9. Method according to claim 1, wherein in step a. the connection seam is cooled in one of downstream or upstream of the seam or laterally.

10. Method according to claim 8, wherein in step d. the aging temperature and/or the aging duration is greater than the aging temperature or aging duration in step b.

11. Method according to claim 1, wherein at least one of the first component and the second component is a semi-finished product.

12. Method according to claim 1, wherein at least one of the first component portion and the second component portion consists of an AlSiMg, AlCu or AlZn alloy.

* * * * *